V. S. K. PETERSEN.
MEASURING THE CONSUMPTION OF HEAT.
APPLICATION FILED MAR. 30, 1917.
1,359,914.
Patented Nov. 23, 1920.
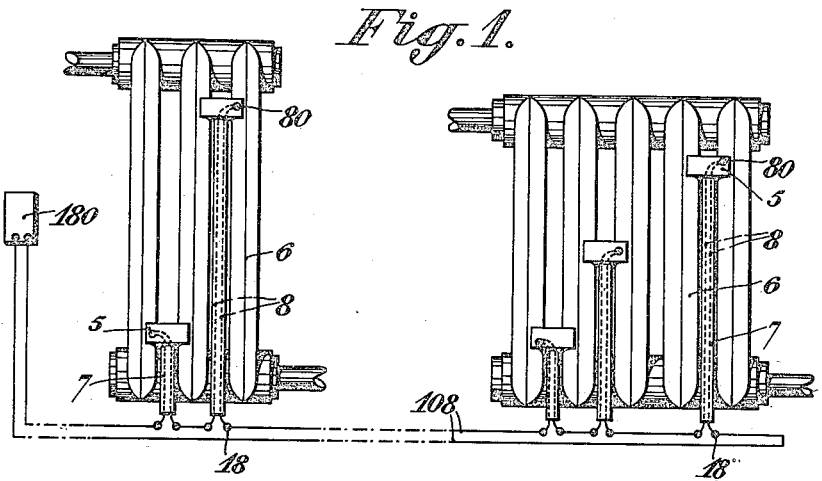
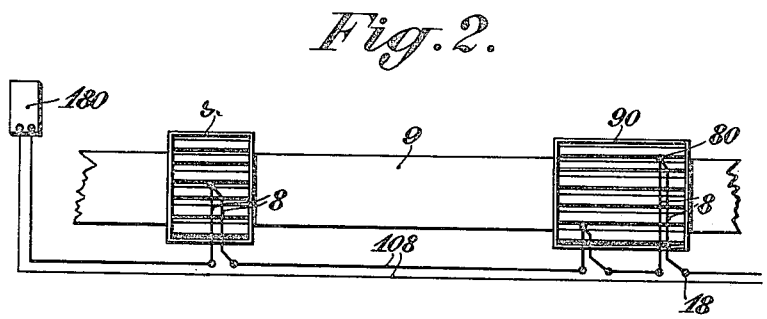
Inventor:
Viggo Stephan Kellner Petersen,
by Alfred Llinn,
a Hy.

UNITED STATES PATENT OFFICE.

VIGGO STEPHAN KELLNER PETERSEN, OF GJENTOFTE, NEAR COPENHAGEN, DENMARK.

MEASURING THE CONSUMPTION OF HEAT.

1,359,914.  Specification of Letters Patent.  Patented Nov. 23, 1920.

Application filed March 30, 1917. Serial No. 158,771.

*To all whom it may concern:*

Be it known that I, VIGGO STEPHAN KELLNER PETERSEN, a citizen of the Kingdom of Denmark, residing at No. 3 Sponnecksvej, Gjentofte, near Copenhagen, in the Kingdom of Denmark, have invented certain new and useful Improvements in Measuring the Consumption of Heat, of which the following is a specification.

My invention refers to a method of and an apparatus for measuring heat calories, more especially the amount of heat emitted from radiators of a central heating plant, from hot water cocks, from steam cocks, and from similar devices, which are used as parts of a central heating plant for the heating of houses, etc. My invention has for its special object to determine the separate consumption of heat by the various tenants, so that it will be possible to ascertain the actual quantity of heat used by each tenant, instead of having to estimate an arbitrary average heat-quantity, which, as a rule, will be too low for the tenant who wastes the heat and, under all circumstances, too high for the tenant who economizes in heat.

My invention consists in transmitting the heat at the different places of heat consumption to thermoelectric elements, an electric current thus being produced in a suitable meter-circuit in such a manner that the quantity of current measured *e. g.* in micro-ampere-hours is proportional to the heat calories consumed or given off during the time in question. If the resistance in the thermo-electric circuit containing the electric meter is constant or approximately constant, then the voltage in the circuit, in order that the aforesaid proportionality shall be present, must be in proportion to two or more of the following factors, namely: first, the temperature of the heating agent (water, steam, or hot air) passing through or circulating in the radiators; secondly, the area of the heat-emitting surfaces or the discharge transverse section; thirdly, the pressure or speed of the heating agent, and, fourthly, the temperature of the outer air or the cold water supply. In some cases, especially where radiators, or the like are used, the required proportionality can be attained without any trouble, but in other cases, especially where a heating agent issuing or being tapped under various pressures is employed, special measures must be taken to insure the proportionality between the factors determining the quantity of heat and the voltage in the meter circuit.

The details of my invention will appear from the following description of the various constructions shown by way of example diagrammatically on the drawing. Figures 1 and 2, illustrate respectively a heating plant consisting of radiators and a hot air plant with adjustable outlet openings.

In a radiator heating-plant as fragmentarily shown in Fig. 1, each tenant is assigned a number of thermo-elements suited to the size of the heat-emitting area. Due consideration is given to the kind and disposal of the radiators, and the thermo-elements, in a suitable manner and numbers, are mounted on each radiator, *e. g.* by means of clamps 5, which can hold each of them in place between two of the radiator's adjacent elements 6. The thermo-elements are connected to a pipe 7, which surrounds the thermo-element 8, and whose lower end, when the apparatus is in place, almost reaches down to the floor, where the one (cold) joint 18 of the thermo-element lies, while the other (warm) joint 80 lies close to the wall of the radiator. A common equipment 5, 7 may be used for two, three, or more thermo-elements connected in series, whereby the allotment of the proper number of thermo-elements to each of several radiators of unequal size is facilitated.

The difference between the temperature of the wall of the radiators (the several joints 80) and the temperature in the surroundings of the radiators, *e. g.* the temperature at the floor (the several joints 18),—that is to say the difference in temperature which determines the quantity of heat emitted by the radiators also determines the potential differences of the thermo-elements. Now since all the thermo-elements are coupled in series in one circuit 108, whose resistance is practically constant, and which contains a suitable electric meter 180, *e. g.* an electrolytic meter, we have, in the measured quantities of electricity, practically quite reliable measurement of the quantities of heat delivered during the time in question.

On the hot-air canal 9 shown in Fig. 2, with outlet grates 90, there is disposed, opposite the latter, a number of thermo-elements 8, according to the size of the outlet grate, so that the warm joint 80 is situated in the hot-air current and the cold one 18 outside it. Otherwise, the arrangement and operations are the same as in Fig. 1.

I claim—

1. Method of measuring the total amount of heat given off by heat emitting bodies of a central heating plant during any period, which consists in producing electric currents by the heat from such bodies acting upon thermo-electric elements exposed also to the surrounding temperature, included in a suitable meter-circuit, and in such numbers that the quantity of electricity produced thereby will be practically proportional to the quantity of heat given off by said heat emitting bodies, and measuring such quantity of electricity.

2. Apparatus for measuring the total amount of heat given off by heat emitting bodies of a central heating plant during any period, comprising, in combination with the said heat emitting bodies, thermo-electric elements, an electric circuit including said elements in series, and a suitable meter included in said circuit the "warm" joints of said elements being exposed to the heat from said heat emitting bodies, while the "cold" joints of said elements are exposed to the surrounding outside temperature.

In testimony whereof I affix my signature.

VIGGO STEPHAN KELLNER PETERSEN.